United States Patent [19]
Elms et al.

[11] 4,080,640
[45] Mar. 21, 1978

[54] PEOPLE-PROTECTING GROUND FAULT CIRCUIT INTERRUPTER

[75] Inventors: Robert T. Elms; Joseph C. Engel, both of Monroeville, Pa.

[73] Assignee: Westinghouse Electric Corporation, Pittsburgh, Pa.

[21] Appl. No.: 727,064

[22] Filed: Sep. 27, 1976

[51] Int. Cl.² ............................................. H02H 3/32
[52] U.S. Cl. .................................... 361/45; 361/49
[58] Field of Search ...................... 361/42, 44, 45, 46, 361/47, 48, 49, 50

[56] References Cited

U.S. PATENT DOCUMENTS 3,976,987  8/1976  Anger .................................. 361/42 X
3,978,400  8/1976  Pettit .................................. 361/44 X Primary Examiner—Harry E. Moose, Jr.
Attorney, Agent, or Firm—Robert E. Converse, Jr.

[57] ABSTRACT

A ground fault circuit interrupter comprises separable contacts for interrupting current flow through a power circuit being protected, trip means operable upon energization to effect separation of the contacts, means for detecting ground fault current, means for monitoring voltage upon the power circuit, and means responsive to the ground fault current detecting means and the voltage monitoring means for energizing the trip means when ground fault current reaches a trip current level. The trip current level varies as a function of the power circuit voltage.

4 Claims, 4 Drawing Figures

PEOPLE-PROTECTING GROUND FAULT CIRCUIT INTERRUPTER

BACKGROUND OF THE INVENTION

1. Field of the Invention

The invention relates to ground fault circuit interrupters and, more particularly, to ground fault circuit interrupters designed to provide protection to human beings accidentally causing a ground fault.

2. Description of the Prior Art

Circuits for supplying alternating current to electrical apparatus normally include two or more conductors. It is desirable that all current flowing through the electrical apparatus being powered travel through these conductors; that is, all currents going toward the load on one conductor of the circuit should return by one of the other conductors, rather than through the ground. In practice this is impossible to achieve for there is always at least a small amount of "leakage current". This leakage current results from less than perfect insulation surrounding the supply circuit conductors and the electrical apparatus being powered. The leakage current, rather than returning through the conductors, returns through the earth or ground. In 120 volts AC circuits, leakage currents should not be more than a few milliamperes. Another occasion in which current traveling out on one of the conductors will not return through one of the other conductors is a ground fault. This occurs when an object or person completes a path from one of the conductors to ground, thereby allowing current flow from the conductor to ground.

People-protecting ground fault circuit interrupters designed for use on 120 volts AC supplies are designed to interrupt the power circuit upon ground fault currents above a certain level. This is done by measuring the net current flow through all of the conductors of the circuit being protected. Under ideal conditions, as described above, the net current flow should be zero, since all of the current traveling toward the load on one conductor should return on one of the other conductors. People-protecting circuit breakers are designed to ignore a small amount of net current flow which occurs because of leakage current. However, when a ground fault occurs which produces a net current flow through the detecting means greater than about 5 milliamperes (5 ma), the people-protecting ground fault circuit interrupter will trip or open. The use of a 5 ma trip level has evolved from measurements of the "can't-let-go" current level of a large population sample which indicated that 99.5% of the population could release an object at high potential if the current flow through their bodies was less than 5 ma.

It is desirable to utilize people-protecting circuit breakers on higher voltage circuits. However, the expected leakage current on circuits supplied with these higher voltages may exceed the 5 ma level. Little use has been made of people-protecting circuit breakers on higher voltage circuits because of leakage current and measurement errors which exceed the equivalent of 5 ma ground current, especially during overload or surge current conditions. It would be desirable to provide a people-protecting ground fault circuit interrupter which could provide protection at voltage levels above 120 volts AC.

SUMMARY OF THE INVENTION

Measurement has been made of the electrical impedance of human skin as a function of applied voltage. Results of these measurements have revealed a highly non-linear voltage dependent characteristic. Thus, it has been found that when the test voltage applied to a pinhead-sized contact area of human skin was increased from 120 volts AC to 240 volts AC, a doubling of the applied voltage, the current flow increased by about 50 times. These tests indicate that current flow through a pinhead-sized contact area at 240 volts will be in excess of 50 ma. Since the size of contact area for an actual accidental ground fault involving a human being will almost certainly be greater than the size of the test contact area, it is clear that the "can't-let-go" criterion is no longer meaningful at this voltage level. In addition, the minimum response time of a circuit breaker to a trip command is typically 16 milliseconds (1 cycle of 60 Hz AC). Thus, even if a 5 ma trip current level is used, the actual current which flows for at least one cycle will be in excess of 50 ma for a contact area the size of a pin head on a 240 volt AC supply. Since the expected leakage current on such a 240 volt AC supply is normally above 5 ma, the amount of nuisance tripping at a 5 ma trip level would be clearly unacceptable, while at the same time failing to limit the accidental ground fault current to a human being to anywhere near the 5 ma level.

A circuit breaker is therefore provided which includes a variable tripping current level, dependent upon the voltage applied to the circuit being protected. The circuit breaker includes a pair of separable contacts for interrupting current flow through the circuit being protected upon energization of a trip mechanism. Means are provided for detecting ground fault currents through the circuit as well as means for monitoring the voltage upon the circuit. For voltages from 0 to 120 volts AC the breaker will trip at a ground current of approximately 5 ma. At higher voltages, the trip current level increases, forming a characteristic similar to that of the impedance of human skin. The trip current level increases to approximately 400 milliamps at 240 volts AC and remains at 400 milliamps for all higher voltages up to the design limit of the circuit breaker.

In this manner a people protecting ground fault circuit breaker is provided which is useful over a wide range of voltages and gives an amount of protection equal to that of prior art ground fault circuit breakers which employ a constant 5 milliamp trip current level, while greatly reducing the amount of nuisance tripping.

DESCRIPTION OF THE PREFERRED EMBODIMENT

Figure 1:
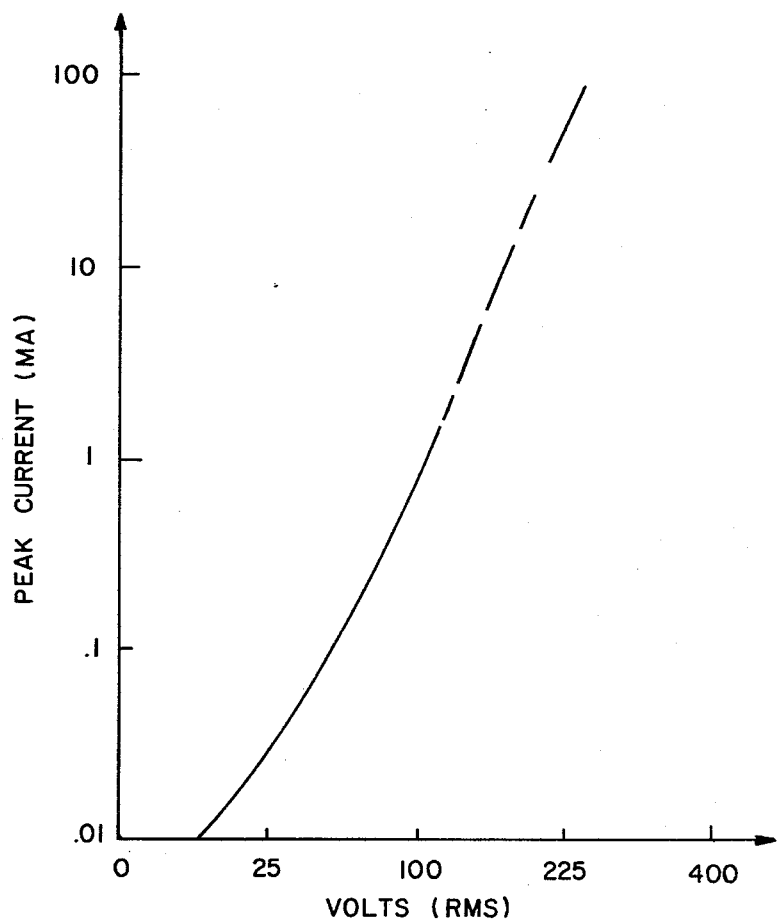
FIG. 1 is a graph showing the voltage-current characteristics of human skin for a pinhead-sized contact area.

FIG. 1 shows the voltage-current characteristics of human skin. The horizontal axis represents voltage (RMS) on a square root scale. The vertical axis represents peak current in milliamperes indicated on a logarithmic scale. The solid line of FIG. 1 shows the voltage-current relationship obtained experimentally using electrode contact areas the size of the head of a common pin. The dotted portion of the curve represents an extrapolation of the data obtained experimentally. It can be seen from FIG. 1 that the voltage-current relationship of human skin is highly non-linear. For example, if 120 volts is applied, a current of approximately 2 ma flows between the electrodes. When the applied voltage is doubled to 240 volts the current flow increases by a factor of more than 25 to over 50 ma. Since most cases in which a human being accidentally forms a line-to-ground fault involve contact areas greater than the size of the head of a pin, it is obvious that at voltage levels about 120 volts, the ground fault current level will be well above 5 ma, the level of tripping current most widely used in the U.S.A.

A typical circuit breaker will exhibit a time delay of approximately 16 milliseconds (1 cycle at 60 Hz) between the detection of the ground fault current and the opening of the breaker. Thus, a ground fault circuit interrupter connected to a 240 volt AC supply will subject a person forming a ground fault to a current greater than 50 ma for a time period of approximately 16 milliseconds no matter how low the trip current level is set. Therefore, no significant increase in protection is obtained by setting the trip current at a low level.

Since the expected leakage current of many 240 volt circuits is greater than 5 ma, an unacceptably large number of tripping operations will occur for circuit breakers having a trip current level of 5 ma, even when there is no need for such a tripping operation to occur. This nuisance tripping is a severe problem on electric circuits requiring high reliability.

Figure 2:
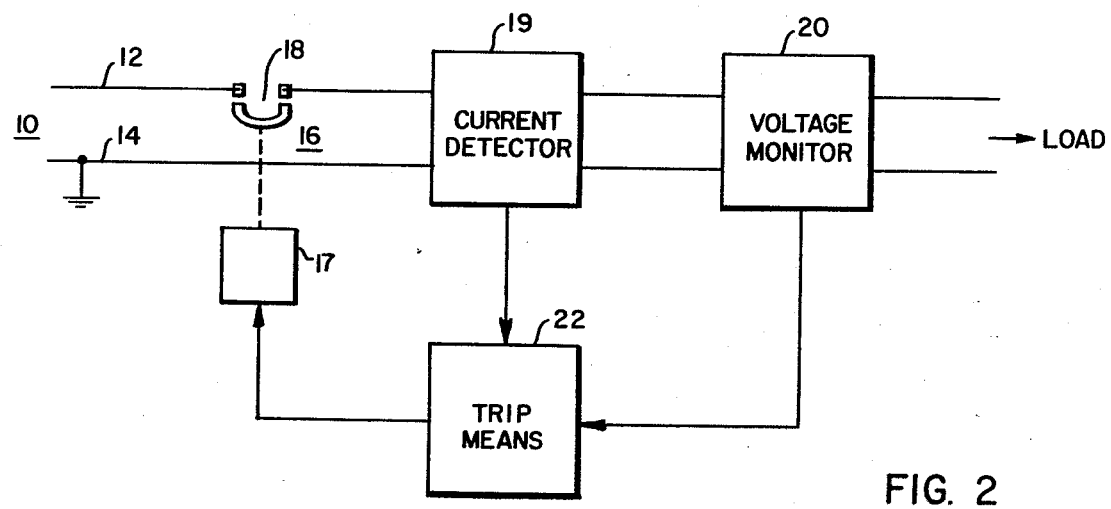
FIG. 2 is a block diagram of a ground fault circuit breaker employing the principles of the present invention.

In FIG. 2 there is shown a block diagram of a ground fault circuit interrupter which can be used at a variety of system voltages; for example, 120 volts to 600 volts. When the circuit interrupter of FIG. 2 is attached to a circuit having a system voltage of 120 volts, the level of ground fault current which will cause the breaker to trip is 5 ma. At higher voltages, however, the tripping current level is increased until at approximately 240 volts the tripping current level is 400 ma. This value of tripping current is based upon the bulk resistance of the human body.

FIG. 2 shows a power circuit 10 comprising a line conductor 12 and a grounded neutral conductor 14. The power circuit 10 is connected to a circuit breaker 16 having separable contacts 18 operable through an actuator 17 to interrupt current flow through the line conductor 12 upon receipt of a tripping signal. Means 19 are provided to detect ground current of the circuit 10 while means 20 monitor the voltage thereon. The current detecting means 19 and voltage monitoring means 20 supply signals to a trip means 22. The trip means 22 supplies a trip signal to the actuator 17 whenever ground current flow through the circuit 10 as detected by means 19 is above a tripping current level. The tripping current level is set by the trip means 22, dependent upon the value of the voltage upon the circuit 10 as monitored by the means 20.

Figure 3:
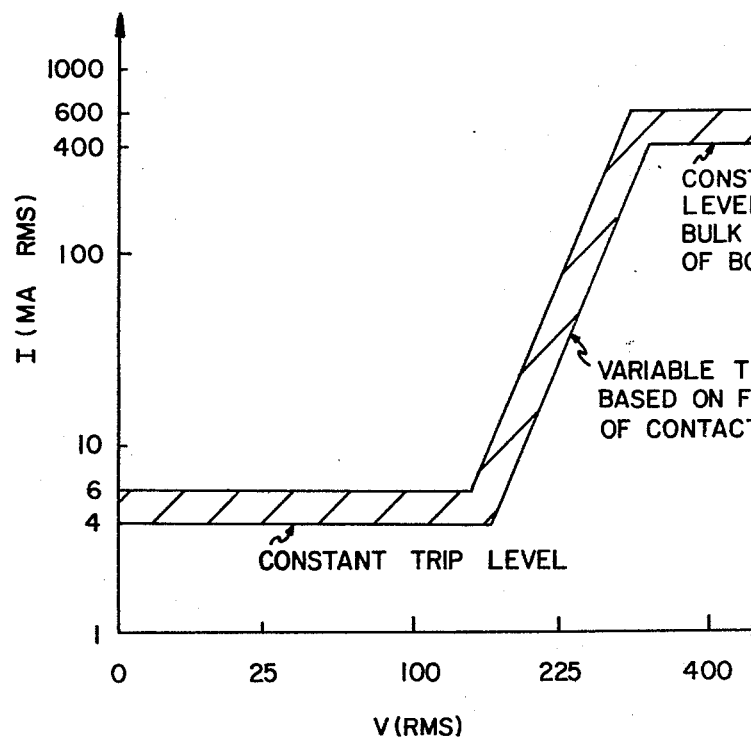
FIG. 3 is a graph of the trip current level characteristic of a ground fault circuit breaker employing the principles of the present invention.

The tripping current level as a function of circuit voltage is shown in FIG. 3 wherein it can be seen the tripping current level is set at about 5 ma for voltages up to 120 volts. A range from 4 to 6 ma is shown, indicating that a tripping operation will never occur below 4 ma and will always occur above 6 ma. At voltages higher than 120 volts, the tripping current level increases to a maximum value of 400 at approximately 240 volts and remains constant for all higher voltages.

The same ground fault circuit interrupter can be used at any voltage from 120 volts to 600 volts and still supply the maximum degree of protection possible. Since the tripping current level increases for increasing voltages in the same manner as expected leakage currents, the problem of nuisance tripping is minimized.

Figure 4:
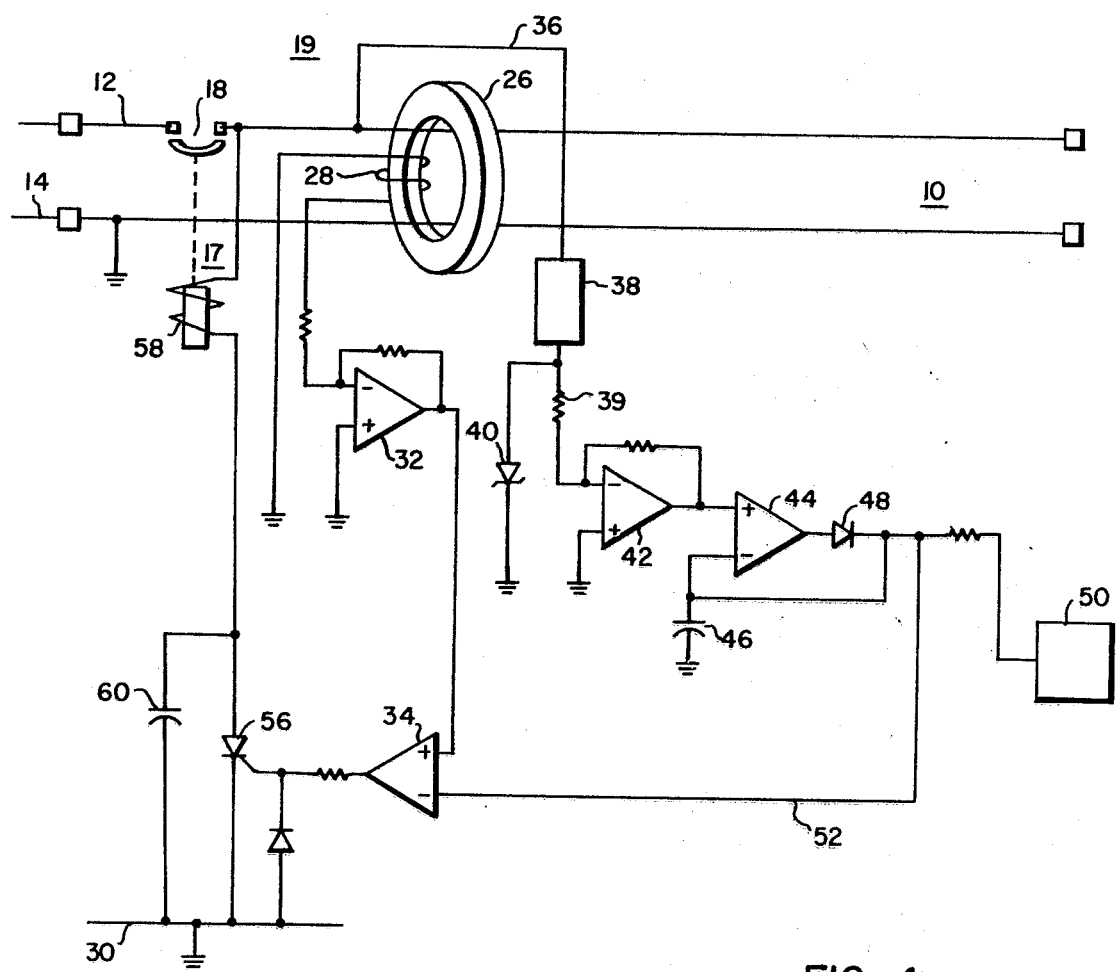
FIG. 4 is a more detailed schematic diagram of the ground fault circuit interrupter shown in FIG. 3.

FIG. 4 is a more detailed schematic diagram of the ground fault circuit interrupter shown in block diagram form in FIG. 2. Current detecting means 19 comprises a current transformer 26 which surrounds the line conductor 12 and neutral conductor 14. The current transformer 26 includes a sense winding 28, one end of which is connected to a common lead 30. The other end of the sense winding 28 is connected through a resistor to the inverting terminal of an operational amplifier 32. The output of the operational amplifier 32 is connected to the non-inverting terminal of a comparator 34.

A voltage monitoring lead 36 is connected between the line conductor 12 and one side of a non-linear resistor 38 of silicon carbide. A Zener diode 40 is connected between the other side of the non-linear resistor 38 and common lead 30. The other side of the non-linear resistor 38 is also connected through a resistor 39 (proportional to the bulk resistance of the human body) to the inverting input of operational amplifier 42, the non-inverting input of which is connected to common lead 30. The output of operational amplifier 42 is connected to the non-inverting input of operational amplifier 44. The inverting input of operational amplifier 44 is connected through a capacitor 46 to common lead 30. A diode 48 is connected between the output and inverting input of operational amplifier 44. A voltage source 50 produces a constant voltage corresponding to the minimum trip level of 5 ma and is connected through a resistor to the inverting input of the comparator 44. A lead 52 is connected between the inverting input of comparator 44 and the inverting input of a comparator 34, and carries a voltage corresponding to the desired tripping current level. The voltage upon the lead 52 is dependent upon the voltage of the power circuit 10.

The output of operational amplifier 32 corresponds to the actual ground fault current flowing through the circuit 10. This output is connected to the non-inverting input of the comparator 34. The output of the comparator 34 remains at zero until such time as the ground fault current through the circuit 10 exceeds the desired tripping current level as set by the lead 52. When this happens, the output of the comparator 34 goes high. This output is connected to the gate terminal of an electronic switching device such as silicon controlled rectifier (SCR) 56.

The input and output terminals of SCR 56 are connected between the common lead 30 and a trip coil 58, the other end of which is connected to the line conductor 12. A capacitor 60 is connected between the input terminal of the SCR and the common lead 30.

When the output of the comparator 34 goes high, gate current is supplied to turn on SCR 56 and create a current flow through the trip coil 58. This action causes the contacts 18 of the circuit breaker 16 to separate and interrupt current flow through the line conductor 12.

Other embodiments are also possible. For example, rather than a continuously variable tripping current level, it may be desired to provide a low trip current level up to a specified circuit voltage, and a second higher tripping current level for voltages above the specified circuit voltage level. Here also, there is provided a ground fault circuit interrupter having a tripping current level which is a function of voltage applied to the circuit being protected. In this manner, it is possible to utilize a single style of ground fault circuit interrupter which will provide maximum possible protection for circuits of several different voltages. This provides a considerable cost savings and alleviates the problem of nuisance tripping which was common on prior art ground fault circuit interrupters.

We claim:

1. A ground fault circuit interrupter, comprising:
   separable contacts for interrupting current flow through a power circuit being protected;
   trip means operable upon energization to effect separation of said contacts;
   means for detecting ground fault currents;
   means for monitoring voltage upon a power circuit being protected;
   means responsive to said voltage monitoring means for setting a trip current level as a function of said power circuit voltage; and
   comparator means connected to said ground fault current detecting means and said trip current level setting means for energizing said trip means whenever a ground fault current reaches said trip current level.

2. A ground fault circuit interrupter as recited in claim 1, wherein said responsive means sets said trip current level at a first value for all power circuit voltages up to a first predetermined voltage, continuously increases said trip current level for increasing power circuit voltages up to a second predetermined power circuit voltage, and sets said trip current level at a second level higher than said first level for all power circuit voltages above said second predetermined power circuit voltage.

3. A ground fault circuit interrupter as recited in claim 2, wherein the increase in said trip current level between said first predetermined power circuit voltage and said second predetermined power circuit voltage is approximately proportional to the increase in conductivity of human skin between said two predetermined circuit voltages.

4. A ground fault circuit interrupter as recited in claim 1, wherein said responsive means sets said trip current level equal to a first value for power circuit voltages up to a predetermined voltage and sets said trip current level equal to a second value higher than first value for all power circuit voltages above said predetermined power circuit voltage.

* * * * *